(12) United States Patent
Fayard et al.

(10) Patent No.: US 6,613,374 B1
(45) Date of Patent: *Sep. 2, 2003

(54) FROZEN CONFECTIONERY PRODUCT AND METHOD OF MANUFACTURE

(75) Inventors: Gilles Fayard, Morieres les Avignon (FR); Michel John Arthur Groux, Lauperswil (CH)

(73) Assignee: Nestec S.A., Vevey (CH)

( * ) Notice: Subject to any disclaimer, the term of this patent is extended or adjusted under 35 U.S.C. 154(b) by 161 days.

This patent is subject to a terminal disclaimer.

(21) Appl. No.: 09/660,286

(22) Filed: Sep. 12, 2000

Related U.S. Application Data

(60) Continuation-in-part of application No. 09/239,308, filed on Jan. 29, 1999, now abandoned, which is a division of application No. 08/558,635, filed on Nov. 14, 1995, now Pat. No. 5,919,510.

(51) Int. Cl.⁷ ............................. A23G 9/00; A23G 9/22
(52) U.S. Cl. ................. 426/565; 426/586; 426/587; 426/588; 426/516; 426/519; 426/522; 426/524; 62/342
(58) Field of Search ................................ 426/565, 586, 426/587, 588, 516, 519, 522, 524; 62/342

(56) References Cited

U.S. PATENT DOCUMENTS

| | | | |
|---|---|---|---|
| 3,647,478 A | 3/1972 | Minor et al. ................... 99/137 |
| 3,764,238 A | 10/1973 | Carpigiani ................... 418/15 |
| 3,914,440 A | 10/1975 | Witzig ......................... 426/130 |
| 4,020,643 A | 5/1977 | Roberts et al. ................ 62/322 |
| 4,031,261 A | 6/1977 | Durst ........................... 426/565 |
| 4,219,581 A | 8/1980 | Dea et al. ..................... 426/565 |
| 4,504,511 A | 3/1985 | Binley ......................... 426/565 |
| 4,507,326 A | 3/1985 | Tarantino ..................... 426/101 |
| 4,713,256 A | 12/1987 | Chaveron et al. ............. 426/631 |
| 4,737,372 A | 4/1988 | Bender et al. ................. 426/5 |
| 4,758,097 A | 7/1988 | Iles, Sr. ....................... 366/149 |
| 4,783,104 A | 11/1988 | Butcher et al. .............. 426/249 |
| 4,795,650 A | 1/1989 | Groubert ..................... 426/306 |
| 4,816,278 A | 3/1989 | Sasamoto et al. ........... 426/513 |
| 4,859,484 A | 8/1989 | Bielskis ........................ 426/573 |
| 4,925,689 A | 5/1990 | Getman ....................... 426/289 |
| 5,013,575 A | 5/1991 | Stadler et al. ............... 426/639 |
| 5,024,066 A | 6/1991 | Goavec ........................ 62/306 |
| 5,048,405 A | 9/1991 | Takahashi et al. ............ 99/470 |
| 5,079,012 A | 1/1992 | Lengerich et al. ............ 426/72 |
| 5,084,295 A | 1/1992 | Whelan et al. .............. 426/565 |
| 5,198,261 A | 3/1993 | Sasaki et al. ................. 426/643 |
| 5,208,050 A | 5/1993 | Ney ............................. 426/202 |
| 5,215,777 A * | 6/1993 | Asher et al. ................. 426/565 |
| 5,262,190 A | 11/1993 | Cunningham et al. ....... 426/549 |
| 5,283,070 A | 2/1994 | Bertrand et al. ............ 426/249 |
| 5,345,781 A | 9/1994 | Fels et al. ..................... 62/343 |
| 5,350,231 A | 9/1994 | Eigruber ....................... 366/85 |
| 5,417,992 A | 5/1995 | Rizui et al. ................... 426/283 |
| 5,425,958 A | 6/1995 | Fazio et al. ................... 426/101 |
| 5,439,695 A | 8/1995 | Mackey ........................ 426/516 |
| 5,486,372 A | 1/1996 | Martin et al. ................ 426/565 |
| 5,919,510 A * | 7/1999 | Fayard et al. ................ 426/565 |
| 6,082,120 A | 7/2000 | Hoffmann et al. ............. 62/68 |
| 6,207,213 B1 * | 3/2001 | Groux et al. ................ 426/516 |
| 6,228,412 B1 * | 5/2001 | Groux et al. ................ 426/516 |

FOREIGN PATENT DOCUMENTS

| | | |
|---|---|---|
| AT | 317 935 | 1/1972 |
| DE | 25 38 8358 | 3/1977 |
| EP | 0 351 476 | 1/1990 |
| EP | 0 401 512 A1 | 5/1990 |
| EP | 0 561 118 | 1/1993 |
| WO | WO 88/01473 | 3/1988 |
| WO | WO 90/12571 | 11/1990 |
| WO | WO 93/02567 * | 2/1993 |

OTHER PUBLICATIONS

Donhowe, D.P. et al., "Determination of Ice Crystal Size Distributions in Frozen Desserts," *J. Dairy Sci* 74:3334–3344, 1991.

Mulder et al., "The Milk Fat Globule Emulsion Science As Applied To Milk Products And Comparable Foods", Center for Agricultural Publishing and Documentation, pp. 101–116 (1974).

Valaer et al., "The state of dispersion of Butterfat in Ice Cream", ICF Research Feature, pp. 10, 30–38, (1961).

Berger et al., "The Structure of Ice Cream Part 1", Dairy Industries, pp. 419–425 (1972).

P. Sherman, "The texture of Ice Cream". T. Wall & Sons (Ice Cream) Ltd..., pp. 201–210.

M. Alderliesten, Mean Particle Diameters, Part I: Evaluation of Definition Systems, Part Syst. Charact. 7 pp. 233–241 (1990).

Kokubo, Effect of Drawing Temperature at a Freezer and Overrun on De–emulsified Fate of Ice Cream, Food Research and Development Lab., Nippon Shokuhin Kogyo Gakkaishi, vol. 41, No. 5, pp. 347–354 (1994).

* cited by examiner

*Primary Examiner*—Nina Bhat
(74) *Attorney, Agent, or Firm*—Winston & Strawn

(57) ABSTRACT

Frozen aerated products having a mean ice crystal diameter of between about 20 and 60 microns and a mean equivalent diameter of about 32 to 36 microns and a homogeneous distribution of fats and proteins. These products are manufactured with a device having two endless screws, identical and parallel, meshing with each other and turning in the same direction, located in a casing fitted at one of its ends with a nozzle and at the other end with an inlet for feeding with composition to be frozen and, in an intermediate area, with an inlet for feeding air. The casing is provided with a jacket in which refrigerating fluids circulate.

15 Claims, 12 Drawing Sheets

(11 of 12 Drawing Sheet(s) Filed in Color)

Figure 3
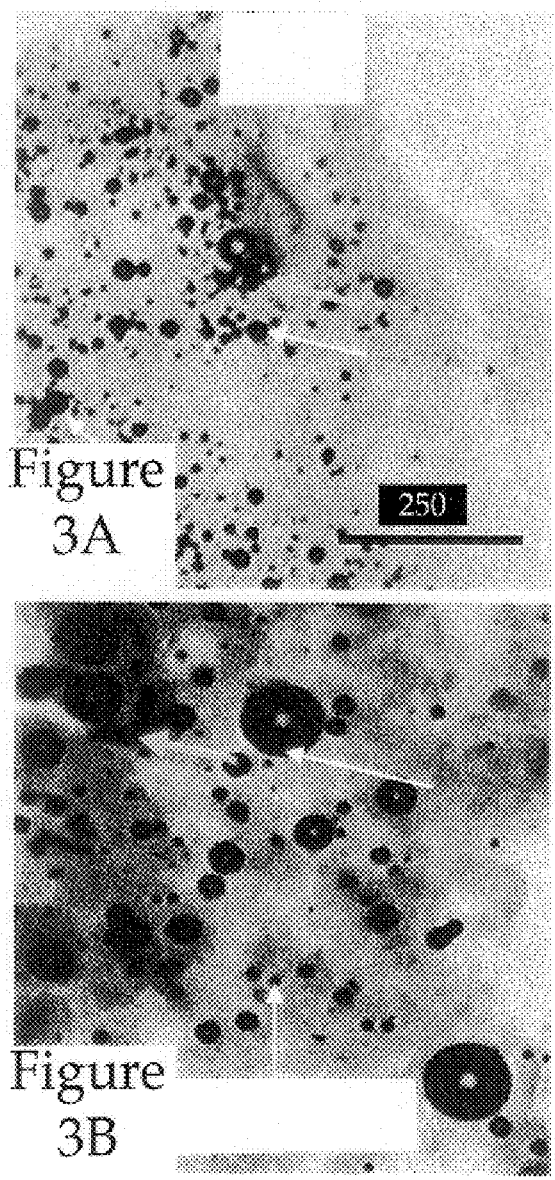
Figure 3A
Figure 3B
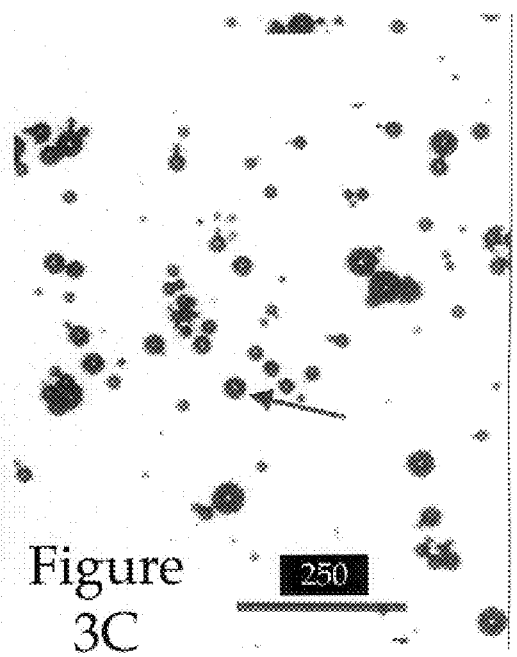
Figure 3C

Figure 4
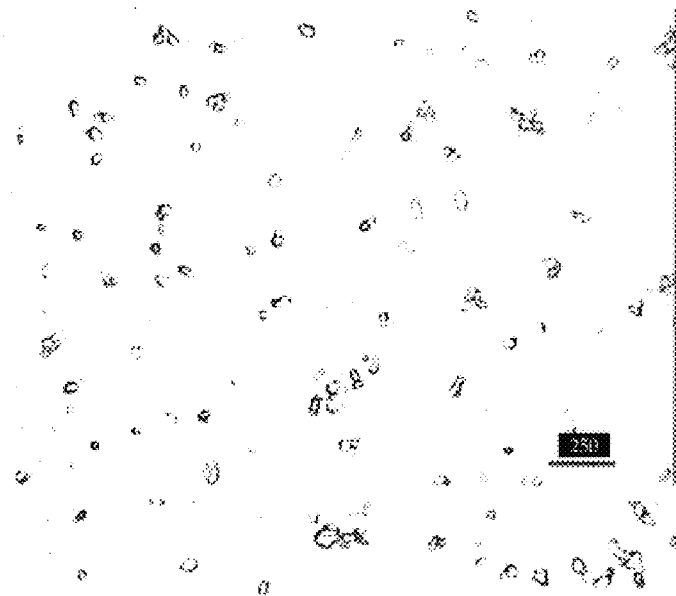
Figure 4A
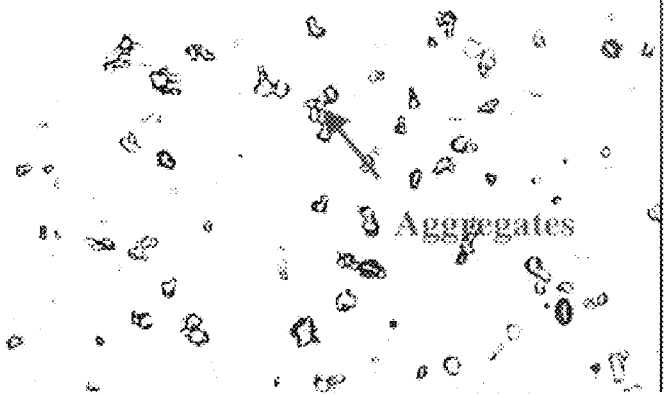
Figure 4B
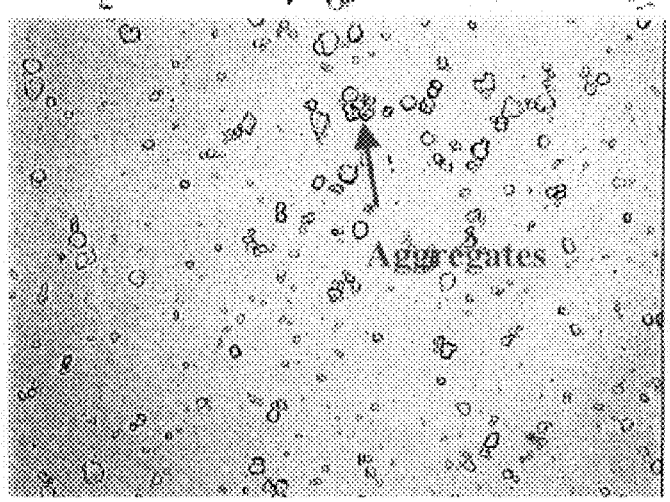
Figure 4C

Figure 5
Figure 5A
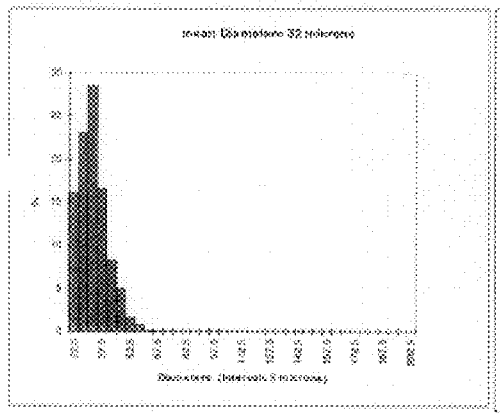
Figure 5B
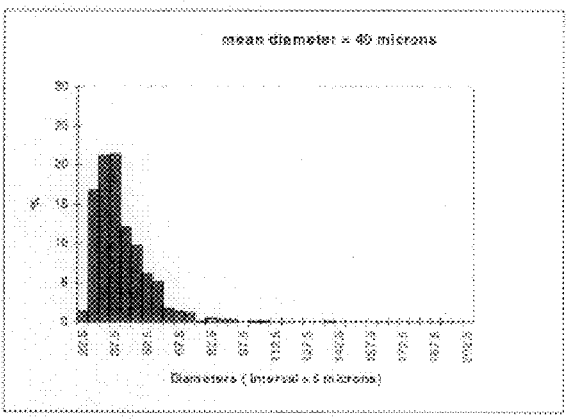
Figure 5C
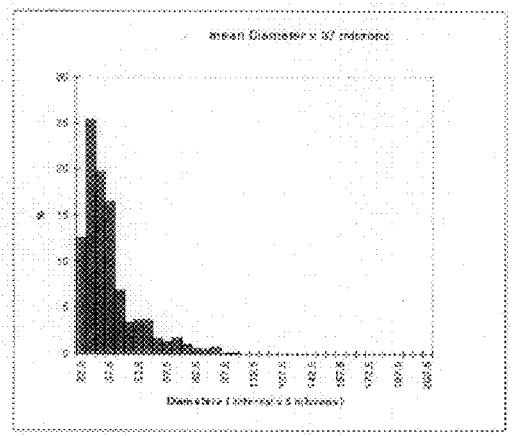

Figure 6
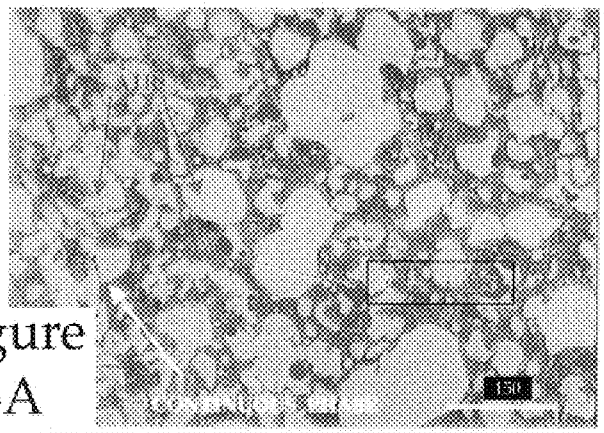
Figure 6A
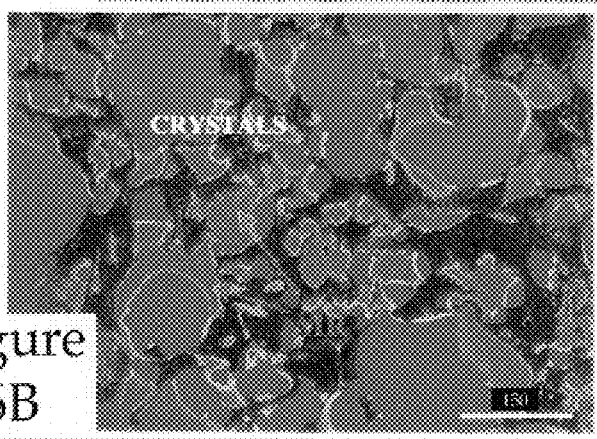
Figure 6B
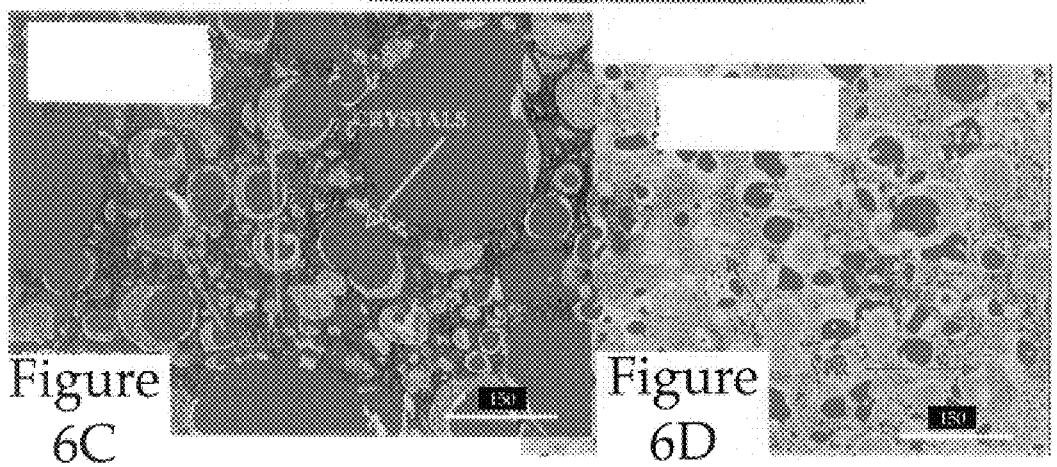
Figure 6C
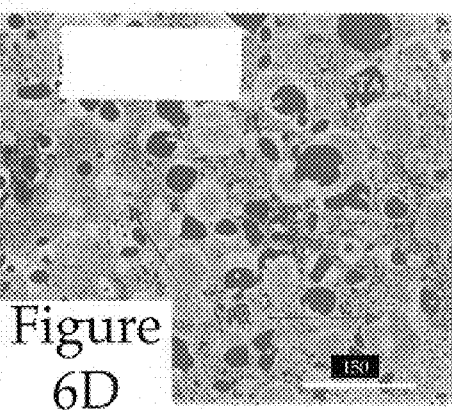
Figure 6D Yellow arrows : Ice crystals
White arrows : Air Red arrows : Ice crystals
Yellow arrows : Protein aggregates Figure 9
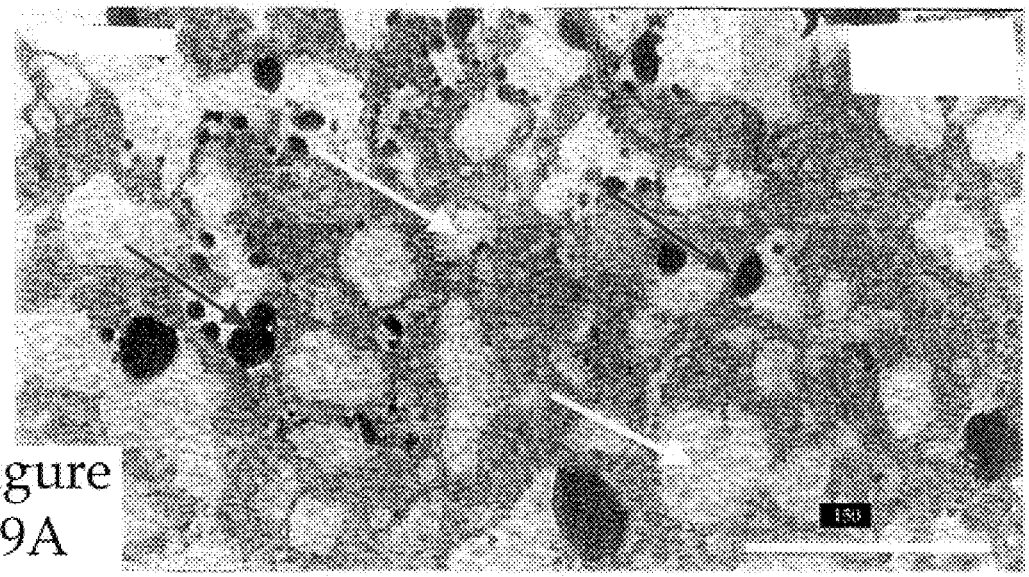
Figure 9A
Figure 9B
Red arrows : Ice crystals
White arrows : Fat crystals Yellow arrows : Ice crystals
White arrow : Fat crystals
Bright dots . Fat globules
A : Air cells surrounded by fat globules Figure 11
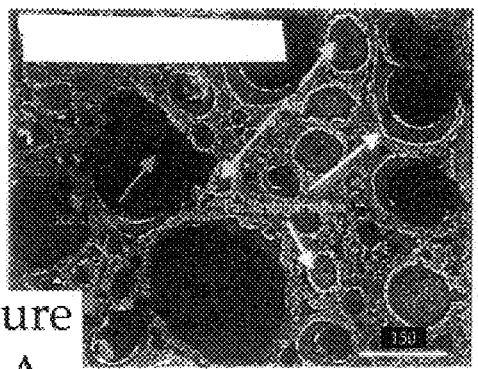
Figure 11A
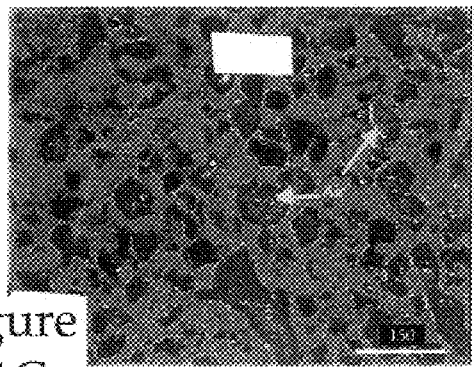
Figure 11C
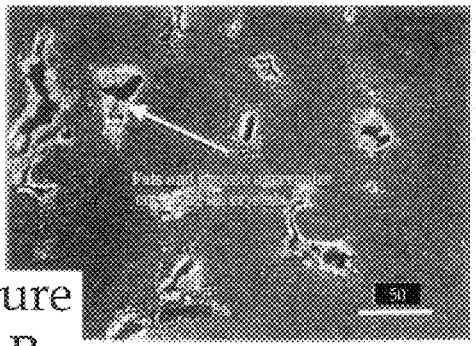
Figure 11B
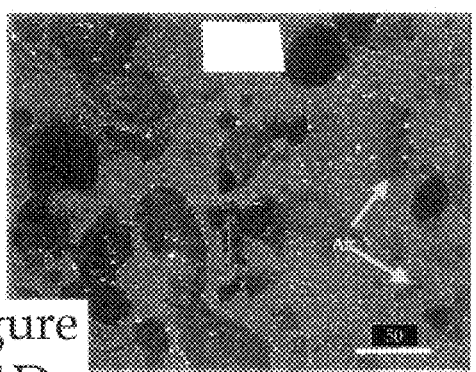
Figure 11D Figure 12
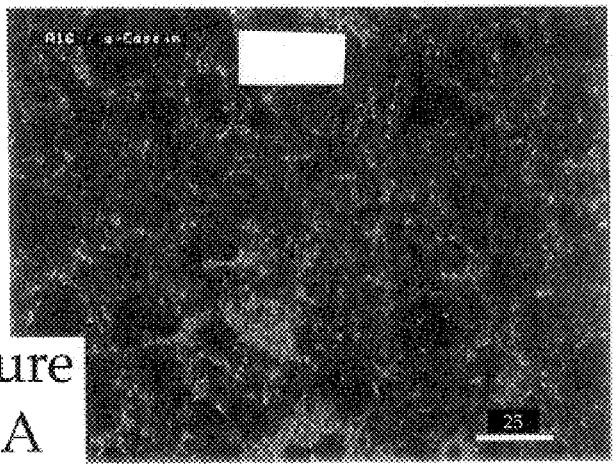
Figure 12A
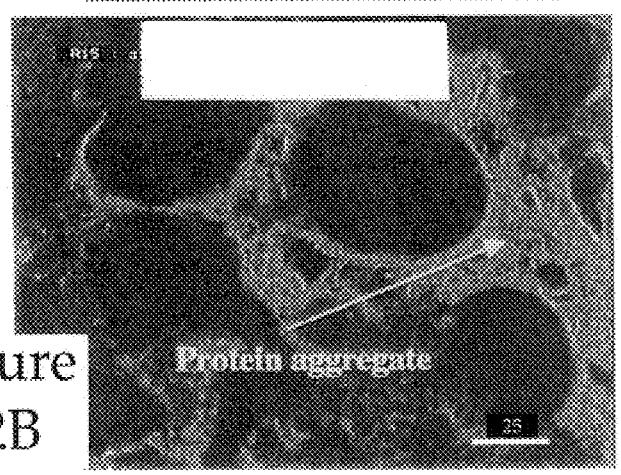
Figure 12B
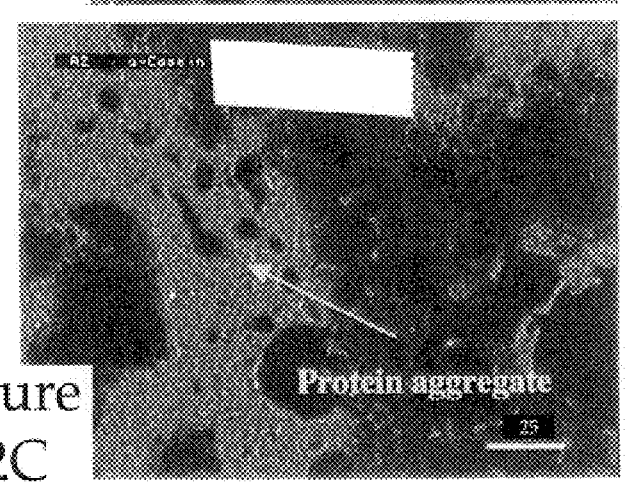
Figure 12C Figure 13
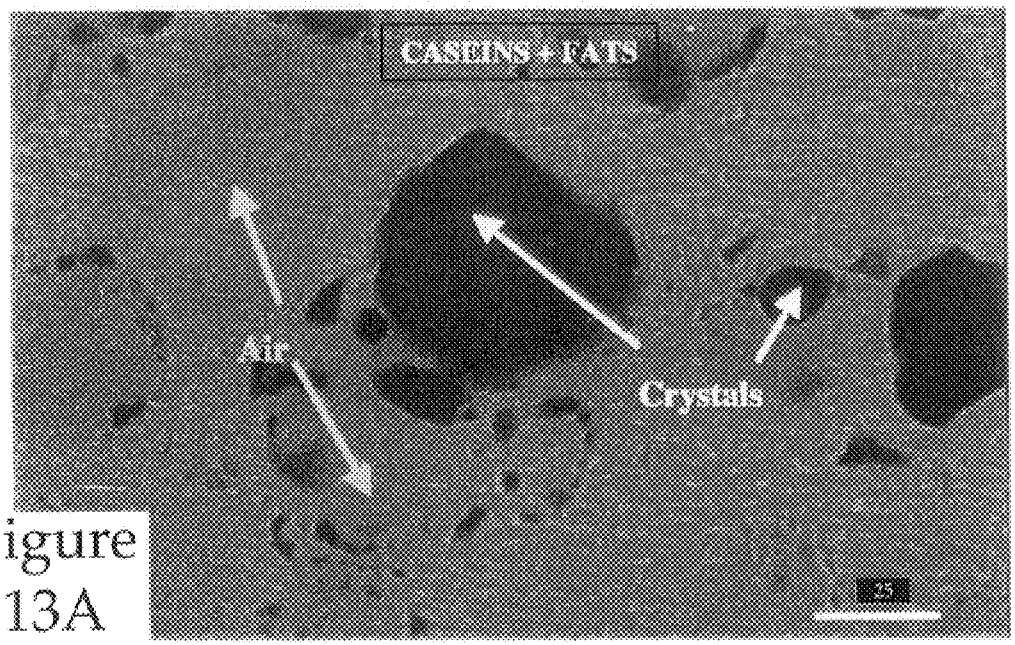
Figure 13A
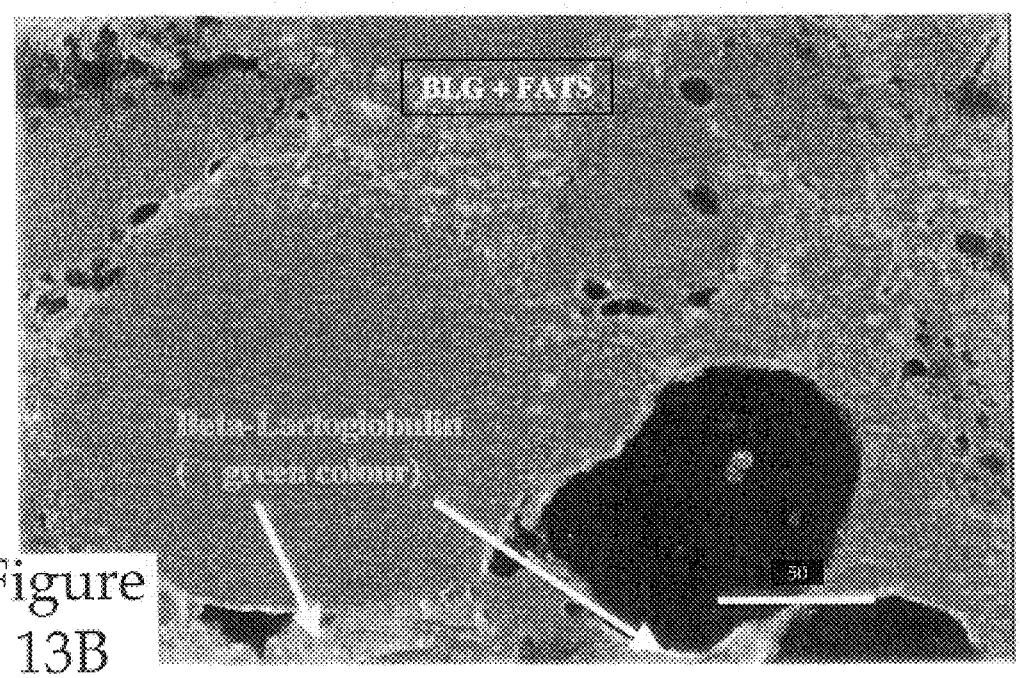
Figure 13B

FROZEN CONFECTIONERY PRODUCT AND METHOD OF MANUFACTURE

This application is a C-I-P of U.S. Ser. No. 09/239,308 filed Jan. 28, 1999 ABN, which is a Div. of U.S. Ser. No. 08/558,635 filed Nov. 14, 1995 U.S. Pat. No. 5,919,510.

FIELD OF THE INVENTION

The invention concerns frozen aerated products, a method for manufacturing same, and a device for implementing the method.

BACKGROUND

Conventional methods for manufacturing frozen aerated products, in particular ice cream, comprise operations for mixing, homogenizing, pasteurizing, freezing, and hardening the mixture to be frozen. Aeration of the mixture or expansion is carried out at the freezing stage in a proportion such that the volume increases by 70 to 120%. On leaving the freezing device (freezer), the temperature of the aerated mass is typically −5 to −6° C. The aerated mass is then hardened at −40 to −45° C. in a hardening chamber, until the core temperature of the product reaches −18 ° C. or less for bulk products or −30° C. for extruded products in bars.

Attempts have been made to lower the temperature of the mass on leaving the freezer, to save energy and with the aim of improving its texture, for example in the sense of greater smoothness. With conventional equipment, however, problems of high viscosity of the mass of ice cream at temperatures below −7 to −8° C. have been an insurmountable problem. This problem has been resolved, in part, by using two scraped surface freezers in series. The first freezer is a conventional freezer and delivers aerated ice cream at a temperature of about −7° C. and the second is specially designed to process the highly viscous mass so as to lower its temperature to around −10° C.

Similarly, EP-A- 0561 118 describes a three-stage method for producing ice cream at low temperature, down to around −20° C. This is an output temperature at which the hardening stage can be completely eliminated for bulk products and appreciably shortened for extruded products. In the first, so-called pre-expansion, stage, air is incorporated into the mixture to be frozen at a positive temperature. In the second stage the aerated mass is cooled in a scraped surface exchanger, emerging at around −6° C. During the third stage a screw device cools the mass to around −20° C.

U.S. Pat. No. 5,024,066 concerns a two-stage system. In the first stage a pre-expansion takes place during which air is added to the mass to be frozen at a positive temperature. In the second stage the aerated mass is cooled, by means of an Archimedes screw with a roughened surface fitted with scraper blades on its periphery, to a sufficiently low negative temperature to ensure that the frozen mass has a stable texture, allowing the products to be stored directly in cold storage.

There remains, however, a need for a method to manufacture frozen aerated products wherein the steps of expansion and cooling the frozen mass can be accomplished in a single device and in a single step.

SUMMARY OF THE INVENTION

The invention is directed to frozen aerated products. In one embodiment the frozen aerated product is fat free and has a mean ice crystal diameter of between about 20 to 60 microns and a mean equivalent diameter for the ice crystals of between about 32 and 36 microns. The frozen aerated product, without fat, may have an overrun between about 20 and 150 percent. The frozen aerated product, without fat, may have protein substantially homogeneously distributed through out the frozen aerated product. The protein may be casein.

In another embodiment the frozen aerated product contains fat and has a mean ice crystal diameter of between about 20 to 60 microns, a mean equivalent diameter for the ice crystals of between about 32 and 36 microns, and fat globules with a mean diameter of from about 8 to 20 microns. The overrun may be between about 20 and 150 percent. The fat may be substantially homogeneously distributed through out the frozen aerated product and the protein may be substantially homogeneously distributed through out the frozen aerated product. The protein may be casein.

The invention is also directed to a method for manufacturing a frozen aerated product. The method involves mixing, aerating, freezing, and cooling a liquid based composition to a temperature of less than or equal to −8 ° C. in a single stage followed by extruding the composition to provide a frozen aerated product having a mean ice crystal diameter of between about 20 to 60 microns and a mean equivalent diameter for the ice crystals of between about 32 and 36. The liquid based composition may be introduced into the stage at about 2 to 5° C. The liquid based composition may be mixed, aerated, frozen, and cooled in a casing that contains two parallel endless co-rotating screws, turning in the same direction while meshing with each other. The co-rotating screws may turn at about 100–600 r/min and the liquid based composition may be aerated to about 20–150% overrun and cooled to about −8 to −20° C. before being extruded.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 3A–3C is a magnified view of ice creams made by three different processes dispersed in a stabilizing mixture of glycerol and Clarke fixative;

FIG. 4A–4C is a magnified view of ice creams made by three different processes dispersed in mineral oil at −10° C. showing the ice crystals;

FIG. 5A–5C is a graphical representation of the size distribution of the ice crystals in ice creams made by three different processes;

FIG. 6A–6D is a computer assisted photomontage of ice creams made by three different processes prepared by a cryofixation technique, which is an adaptation of the crysubstitution technique;

FIG. 9A–9B is a computer assisted photomontage of ice creams made by three different processes prepared by a cryofixation technique, which is an adaptation of the crysubstitution technique;

FIG. 11A–11D is a magnified view of ice creams made by three different processes prepared by a cryofixation technique, which is an adaptation of the crysubstitution technique;

FIG. 12A–12C is a magnified view of ice creams made by three different processes prepared by a cryofixation technique, which is an adaptation of the crysubstitution technique;

FIG. 13A–13B is a magnified view of ice creams made by three different processes prepared by a cryofixation technique, which is an adaptation of the crysubstitution technique, showing fats, caseins and Beta-Lactoglobulins.

DETAILED DESCRIPTION OF THE PREFERRED EMBODIMENTS

Figure 1:
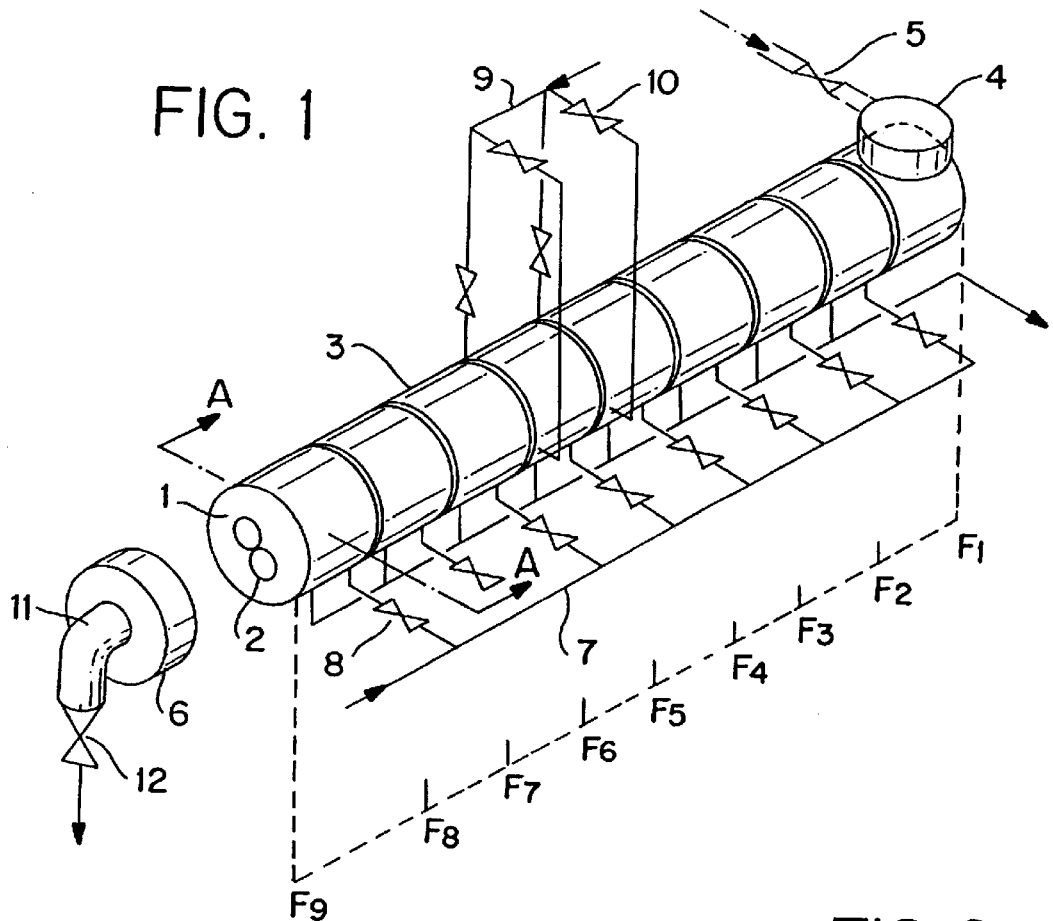
FIG. 1 is an exploded schematic view of a device according to the invention.

The present invention relates to a frozen aerated product and to a method and a device for making the same. Preferably, the operations of expansion and cooling of the mass take place in one step in a single device. The device of the invention is easier to control and of smaller size than the known devices. The device of the invention simplifies the low-temperature freezing method while taking advantage of the energy and texture benefits mentioned previously. In addition, the device of the invention provides a frozen aerated product that is of superior quality compared to products obtained with conventional devices. Thus, the process of the invention is also directed to the frozen aerated product prepared by the device of the invention.

The invention involves a process for manufacturing frozen aerated products in which a composition to be frozen is mixed, aerated, frozen, and cooled to a temperature equal to or less than $-8°$ C., and passed through a nozzle, characterized in that these operations take place in one stage only in a single device comprised of two parallel endless screws, turning in the same direction while meshing with each other, and located in a casing fitted with aeration and cooling means.

Whereas one might have feared that the texture of the frozen composition might be impaired during processing in a twin screw device it has been noted with surprise that it was possible to aerate, mix, cool, and extrude a composition for an ice confectionery in a single stage to obtain a frozen aerated product at a low temperature that has an improved and stable texture. This is not obvious, since known methods make provisions for the aeration to take place in a separate device prior to cooling and for the cooling or freezing to be carried out, at least partially, in a device equipped with scraper blades.

According to the method, a composition for an ice confectionery such as ice cream, low fat ice cream, or sorbet is prepared in a conventional manner, according to the recipe, by combining one or more of milk, skimmed milk, cream, condensed milk, milk powder, or butter oil, to which is added one or more of sucrose; glucose; fruit dextrose; fruit pulp; stabilizing hydrocolloids such as, for example, carrageenates, alginates, carob gum; emulsifiers such as, for example, partial glycerides; and flavorings. After intimate mixing of the ingredients in the proportions dictated by the recipe, pasteurizing, cooling, followed by hot homogenizing under pressure conditions are carried out, allowing a reduction of the mean fat globule size. After cooling the homogeneous mass to a low temperature, typically below about 4° C., preferably below about 2° C. and more preferably about 0° C., the composition is allowed to mature for some time at this temperature. Typically the composition is allowed to mature for from about 2 to 24 hours, preferably from about 4 to 20 hours. Homogenizing and maturing are optional steps.

This matured mass is referred to in the remainder of the description as the "mass to be frozen." The mass to be frozen is introduced, preferably at a temperature of about 2–5° C., into a twin-screw freezing device, which will be described in more detail below, in which it is mixed by the co-rotating screws turning at high speed, preferably at about 100–600 r/min, conveyed to an air injection area where it is expanded to about 20–150% overrun, highly cooled, to $-8$ to $-20°$ C., and then forced through a nozzle. Surprisingly, the work in the twin-screw device is carried out without excessive shearing, so that the rise in pressure does not exceed around 50 bar at the nozzle.

The resulting frozen aerated product is superior to frozen aerated products made with conventional methods and devices. The product has a superior texture compared to products made by conventional processes. The process of the invention provides an ice cream that has smaller, rounder ice crystals. Furthermore, the ice crystals have a more narrow size distribution, less aggregation, and a more uniform distribution within the product compared to ice cream obtained by prior art methods. The frozen aerated product produced by the method of the invention is characterized by a mean ice crystal diameter of between about 20 to 60 microns and a mean equivalent diameter for the ice crystals of about 32 to 36 microns. These values are appreciably lower than can be obtained with conventional freezers. The term "ice crystal diameter," as used herein means the largest cross sectional distance of the ice crystal. The term "equivalent diameter," as used herein means the diameter of a circle that has an equivalent surface area as the surface of the crystal. The term "mean," as used herein is the arithmetic mean of measurements taken on several ice crystals. The ice crystal size may be readily determined by one or ordinary skill in the art using a dispersion of ice crystals in mineral oil at $-10°$ C. Ice crystal size may be determined, for example, by the method disclosed in "Determination of Ice Crystal Size Distributions in Frozen Desserts," by D. P. Donhowe et al., *J Dairy Sci.,* 74: 3334–3344 (1991), the contents of which are expressly incorporated herein by reference. The frozen aerated product of the invention also has smaller air cells and there is less coalescence of the air cells compared to prior art products. The frozen aerated product of the invention also has fat globules in the melted liquid state, as determined by the Malvern method (laser scattering), that are less than 20 microns, preferably from about 4–20 microns, and more preferably from about 8 to 20 microns.

The process of the invention also provides a frozen aerated product wherein the proteins, especially casein, are more homogeneously distributed within the product compared to aerated products made using prior art processes. FIG. 12 depicts casein distribution in ice cream prepared by the process of the invention (panel A) and by conventional ice cream making processes (panels B and C). Protein distribution was studied using polyclonal rabbit anti-casein antibodies and an indirect immunofluorescense microscopy also called "the sandwich technique." Examination of the panels in FIG. 12 shows that in ice cream prepared by the conventional processes the proteins tend not to distribute homogeneously and tend to form aggregates. In contrast, the protein (casein) in ice cream prepared by the process of the invention is substantially homogeneously, i.e., evenly distributed through out the ice cream (panel A).

Figures 10, 10A, 10B:
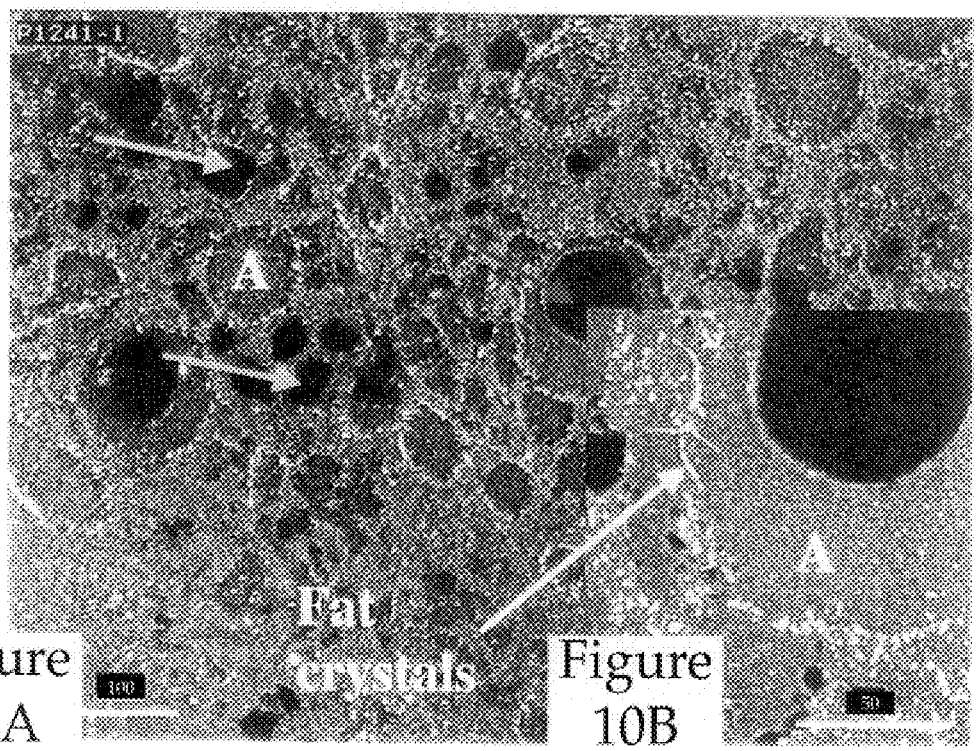
FIG. 10A–10B is a magnified view of ice creams made by three different processes prepared by a cryofixation technique, which is an adaptation of the crysubstitution technique.

Similarly, fats are more homogeneously distributed within the continuous phase of the frozen aerated product of the invention. FIG. 10 is a microscopic view that depicts the fat distribution in an ice cream made by a conventional process. Similarly, FIG. 11 shows microscopic views of ice cream prepared by two conventional processes (panels A and B) and ice cream prepared according to the process of the invention (panels C and D). In these figures the ice cream is stained using Nile red, a liposoluble stain. The evenly distributed reddish color in panels C and D show that the fat is substantially homogeneously distributed in the ice cream of the invention and that the fat in the ice cream of the invention is more homogeneously distributed compared to ice cream produced by conventional processes. Preferably, the product has a mean fat globule size of around 8–20 microns as determined by Malvern analysis (laser scattering), which determines the fat globule size in the ice cream in the liquid state after melting the ice cream. These characteristics result in a frozen aerated product with improved texture in the sense of greater smoothness and greater creaminess.

The invention also concerns a device for implementing the above method. The device comprises two endless screws, identical and parallel, meshing with each other and turning in the same direction, located in a casing fitted at one of its ends with an extrusion nozzle and at the other end with means for feeding the mass to be frozen into the device, and, in an intermediate area between the two ends, with means for feeding air into the composition, the casing being provided with a jacket in which refrigerating fluids circulate.

The two endless screws may have successive segments where the form of the screws varies from one segment to another, for example the orientation of the threads and their pitch may vary. The configuration of the screws is arranged to effect the transport, mixing, cutting, and compressing operations of the mass as the mass is urged towards the nozzle and to promote the incorporation of gas into the mass to be frozen so as to obtain good expansion. Provisions may be made for intermediate areas for stirring, for example by means of mono-lobed and bibbed discs with positive orientation, having a conveying effect, or negative orientation, having a backing-up effect, or a segment with reverse screw pitch inducing a backing-up.

The casing is fitted with cooling means composed of a double envelope, preferably with, an independent cooling circuit per segment, with valves for controlling the flow rate of refrigerating agent so as to allows individual temperature regulation for each segment.

Air may be injected by means of flow meters through pipes at different points on the casing, and preferably in the second half of its length, and preferably on each side of the latter. In this way, preferably, 80 to 150% overrun may be achieved.

Preferably, the nozzle is in the form of a counter-cone, the function of which is to combine the spaces surrounding each screw into a single output aperture. The output may be horizontal or vertical. The geometry and dimensions of the nozzle or, where applicable, the diameter and length of any output pipe which may be associated with it, are designed to provide a back pressure of around 4 to 50 bar, and preferably 4 to 25 bar. The back pressure may be adjusted by means of, for example, a ball valve downstream of the pipe in question. In the case of an output temperature of the product that is close to the lower limit the diameter of the output pipe must be increased to compensate for the drop in pressure due to the head loss caused by the increase in viscosity when the temperature of the mass falls. Preferably, the nozzle is cooled, for example by means of a jacket in which a cooling fluid circulates.

As shown in FIG. 1, the device comprises two extrusion screws 1 and 2, identical and parallel, rotating about their axis and turning in the same direction, driven by a motor, not shown. The screws 1 and 2 are mounted in a casing 3, which has at its start a pipe 4 for feeding with mass to be frozen provided with a non-return valve 5 to ensure an air seal and which ends with a nozzle 6 in plate form.

The casing comprises nine 100 mm long segments F1 to F9, modifiable from the screw configuration point of view, associated with each segment are individual cooling circuits 7 for corresponding jackets carrying a water-alcohol mixture, with individual adjustment of the flow rate by means of valves 8. Aeration takes place through the air inlets 9 on each side of the casing and the air is injected by a piston fitted with a mass flowmeter. The air flow rate is adjusted individually by valves 10.

In a variant, not shown, the nozzle 6 is provided with a jacket wherein a cooling fluid circulates, the flow rate of which can be adjusted.

At the output end of the casing 3 and nozzle 6 a pipe 11 serves as a pre-expansion area. The pipe 11 is provided with a ball valve 12 for controlling the back pressure and the residence time of the mass in the casing.

Let L be the total length of the segments of one of the screws 1 and 2, which represents the active length of these screws, and D the diameter of one of the screws 1 and 2; the ratio L/D is typically of the order of about 30 to 60.

Figure 2:
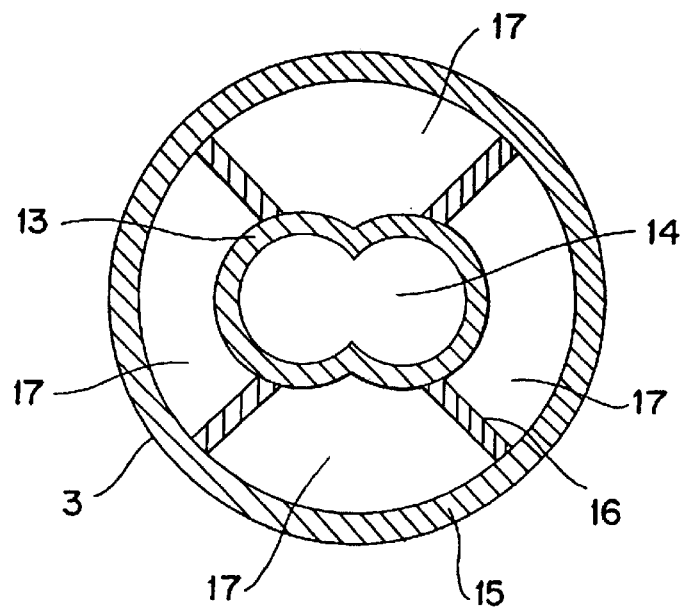
FIG. 2 is a schematic transverse section of the casing of the device of FIG. 1, taken along line A——A thereof.

In FIG. 2, it can be seen that the casing 3 has an internal metallic envelope 13 surrounding the channel 14 for passage of the screws 1 and 2 (not shown) and an external metallic envelope 15 maintained at a distance from the envelope 13 by struts 16. A cooling fluid circulates in the channel 17 between the walls formed by the envelopes 13 and 15.

EXAMPLES

The invention is further defined by reference to the following examples describing in detail the preparation of the frozen aerated product of the present invention. The examples are representative, and they should not be construed to limit the scope of the invention in any way. The percentages are by weight.

EXAMPLE 1

A mass to be frozen of low freezing point, containing 8.5% lactic fat (in the form of cream at 35% fat content), 11% non-fat milk solids, 12% sucrose, 6.4% glucose syrup (of dextrose equivalent 40), 1 % dextrose, 0.47% partial glycerides as stabilizers/emulsifiers, and 0.4% vanilla flavoring, was prepared. The total solid content of the composition was 39.15%, the balance being accounted for by water. The mixture was homogenized in two stages at 135 bar, then 35 bar, was pasteurized at 86° C. for 30 seconds, cooled to 4° C., and stored for 24 hours at this temperature. This composition was introduced into the device under the operating conditions indicated below.

—Configuration of the screws 1 and 2

| Segments | F1 | F2 | F3 | F4 | F5 | F6–F7 | F8–F9 |
|---|---|---|---|---|---|---|---|
| Type of screw | T | T | T | M/C | T | CO | CO |

With T: Transport, M: Mixing C: Shearing and CO: Compression

—Injection of air: at 9 from a single side in F5
—Flow rate/temperature of the composition to be frozen: 11 kg/h in F1/10° C.
—Inlet temperature of the refrigerating fluid:–17° C.
—Rotation speed of the screws: 600 rev/mm
—Diameter of the nozzle (without pipe or output valve): 1.2 mm
—Temperature in the casing segments and the nozzle plate:

| Segments | F1–F2 | F3 | F4–F9 | Plate 6 |
|---|---|---|---|---|
| Temperature (° C.) | +3 to +5 | –8,5 | –9 | –10 to –11 |

The temperature of the mass at the output of the nozzle 6 was –10.5° C. The overrun was 65% (increase in volume with respect to the non-aerated mass).

The product obtained had a smoother and creamier texture than the products made in a conventional manner.

EXAMPLE 2

In this example, the composition for freezing was the same as that of Example 1 and the operating conditions were as follows:

—Configuration of the screws 1 and 2

| Segments | F1 | F2 | F3 | F4 | F5 | F6–F7 | F8–F9 |
|---|---|---|---|---|---|---|---|
| Type of Screw | T | T/M | T/M | M/C | T | CO | CO |

With T: Transport, M: Mixing, C: Cutting and CO: Compression

—Injection of air: at 9 from both sides in F5 and F6, that is by means of 4 pipes with a flow rate of 7.8 L/h
—Flow rate/temperature of the composition to be frozen: 10 kg/h in F2/10° C.
—Inlet temperature of the refrigerating fluid: –25 to –28° C.
—Rotation speed of the screws: 600 rev/min
—Diameter of the nozzle, with pipe 11 and outlet valve 12:10 mm
—Temperature in the casing segments and the nozzle plate:

| Segments | F1–F2 | F3 | F4–F9 | Plate 6 |
|---|---|---|---|---|
| Temperature (° C.) | +8 to +12 | –8 to –9 | –10 to –14 | –12 |

The temperature of the mass at the outlet of the nozzle 6 was –8 to –10° C.

The overrun was 80 to 100%. The mean ice crystal diameter was measured using a conventional technique wherein the crystals are diluted in cold oil at –10° C. and the mean ice crystal diameter of about 1000–1500 ice crystals are measured automatically by optical microscopy at a magnification of 100 to 150X at –10° C. from about 10 views. The mean ice crystal diameter ($D_{1.0}$) was 25 microns. The mean fat globule diameter measured by the Malvern technique (laser scattering) was 11.3 micron.

The product obtained had a smoother and creamier texture than the products made in a conventional manner.

EXAMPLES 3–6

The same composition for freezing was used as was used in Example 1 and the same screw configuration and conditions were used as in Example 2, apart from:

—The flow rate of the composition to be frozen: 9.5 kg/h,
—The temperature in the segment F2: 4.5 to 5.5° C.,
—The temperature of the refrigerating fluid at the inlet of the casing cooling circuit: –26.5 to –27.5° C.

Another difference was that the rotation speed of the screws was varied, as shown below. The following parameters were recorded for the products emerging:

| Example | 3 | 4 | 5 | 6 |
|---|---|---|---|---|
| Speed (r/min) | 600 | 300 | 200 | 100 |
| Output Temperature (° C.) | –8.5 | –10 | –11 | –12.2 |
| Overrun (%) | 90 | 90 | 85 | 80 |
| Pressure at plate 6(bar) | 2 | 7 | 11 | 23 |

The mean-ice crystal diameter ($D_{1.0}$, micron) measured by optical microscopy at –10° C. as described in example 1 and the mean fat globule ($D_{v0.5}$, micron) diameter measured by the Malvern technique (laser scattering) were:

| Example | 3 | 5 | 6 |
|---|---|---|---|
| $D_{1.0}$ | 13 | 26 | 19 |
| $D_{v0.5}$ | 8.44 | 17.17 | 14.02 |

In every case, the resulting products had a smoother and creamier texture than the products made in a conventional manner.

EXAMPLES 7–8

The same composition for freezing was used as was used in Example 1 and the same screw configuration and conditions were used as were used in Example 2, apart from:

—The flow rate of the composition to be frozen: 9.5 kg/h,
—The temperature in the segment F2: 3 ° C.,
—The temperature of the refrigerating fluid at the inlet of to the casing cooling circuit: –25.9 to –27.1 ° C.,
—The rotation speed of the screws, was 600 r/min in Example 7 and 100 r/min in Example 8,
—at the outlet of the nozzle was a pipe 11 of 20 mm diameter and a ball valve 12.

In the case of Example 7, the outlet temperature of the product was –8.4° C. and the overrun 90%.

In the case of Example 8, the outlet temperature of the product was –12.4° C., the overrun 80% and the pressure at the nozzle 9 bar.

The ($D_{1.0}$, micron) of about 1000–1500 ice crystals were measured automatically by optical microscopy at −10° C. from about 10 views and the mean fat globule diameter measured by the Malvern technique (laser scattering) ($D_{v0.5}$, micron) were:

| Example | 7 | 8 |
|---|---|---|
| $D_{1.0}$ | 23 | 24 |
| $D_{v0.5}$ | 10.35 | 13.35 |

In every case, the resulting products had a smoother and creamier texture than the products made in a conventional manner.

EXAMPLE 9

The product was manufactured following the conditions of Example 7, apart from the following characteristics:
—Configuration of the screws 1 and 2

| Segments | F1 | F2 | F3 | F4 | F5 | F6–F7 | F8–F9 |
|---|---|---|---|---|---|---|---|
| Type of Screw | T | T/M | T/M | M/C | M/C | CO | CO |

With T: Transport, M: Mixing, C: Shearing and GO: Compression
—Injection of air: at 9 from both sides in F5 and F6, that is by means of 4 pipes with a flow rate of 9.9 L/h.

The mean-ice crystal diameter ($D_{1.0}$, micron) measured by optical microscopy at −10° C. as described in example 1 was 26 micron. The mean fat globule diameter measured by the Malvern technique (laser scattering) was 8.82 micron.

EXAMPLES 10–11

In these examples, the composition for freezing was prepared in the same way as Example 1 and the following operating conditions were applied:
—Configuration of the screws 1 and 2

| Segments | F1 | F2 | F3 | F4 | F5 | F6 | F7 | F8 | F9 |
|---|---|---|---|---|---|---|---|---|---|
| Type of Screw | T | T/M | T/M | M/C | T | CO | M/CO | M/CO | CO |

With T: Transport, M: Mixing, C: Shearing and CO: Compression

For example 10:
—quantity of incoming product 10 kg/h
—Injection of air: through 9 of the 2 sides in F5 and F6, by means of 4 conduits with a Flow of 12 g/h
—Rotating speed of the screw: 300 r/min
—Cooling of areas F2 to F9 by means of a freezing liquid to −30/−35° C.

The exiting temperature of the product was −11.5 ° C. with a 100% overrun.

For example 11:
—Quantity of incoming product 10 kg/h
—Injection of air: through 9 of the 2 sides in F5 and F6, by means of 4 conduits with a flow of 13 g/h
—Rotating speed of the screw: 100 r/min
—Cooling of areas F2 to F9 by means of a freezing liquid to −30/−35° C.

The exiting temperature of the product was −14.5° C. with a 90% overrun.

The resulting products had a smoother and creamier texture than the products made in a conventional manner taken as a reference.

Accelerated ageing was created by means of thermal shocks in a heated stove, programmed with a cycle of temperatures simulating the conditions to which these products are subjected during their distribution in the chain from freezer to the consumer.

The mean diameter of the ice crystals ($D_{1.0}$, micron) measured by optical microscopy at −10° C., as described in example 1, and the mean diameter of the fat globules measured by the Malvern technique (laser scattering) ($D_{v0.5}$, micron) were:

| Example | 10 | 11 |
|---|---|---|
| $D_{1.0}$ before ageing | 18 | 19 |
| $D_{1.0}$ after ageing | 57 | 77 |
| $D_{v0.5}$ | 4.37 | 7.89 |

As a comparison, the corresponding values for the reference were:

$D_{1.0}$ before ageing: 28,
$D_{1.0}$ after ageing: 94,
$D_{v0.5}$: 0.91.

Knowing that destabilization of the fats contributes to the fatty perception of an ice cream, it is noted that in those ice creams prepared according to the invention, the level of destabilization of the fats was always greater than in the case of conventional products. Fat destabilization is well known to one of ordinary skill in the art and is the reduction in size of the fat globules. Destabilization of fats is typically a result of homogenization. The smaller fat particles typically surround air cells.

EXAMPLE 12

A mixture of low fat ice cream, containing 5% fats, was used. The preparation consisted of mixing 14.28% cream with a 35% fat content, 8% non fatty milk solids, 15% saccharose, 3.303% glucose syrup (dextrose equivalent 40), 1 % dextrose, 0.5% partial glycerides as stabilizers/emulsifiers and 0.4% vanilla essence. The total percentage of the solids in the composition was 33.06%, the rest was water. The mixture was then homogenized in 2 stages at 224 bar, then 40 bar, pasteurized at 86° C. for 30 s, cooled at 4° C., and stored for 24 h at this temperature. This mixture was then placed in the freezing device using the same operating conditions and screw configuration as given for Example 10. The temperature of the mass upon its emergence from the extruder was −11.5° C. and the overrun was 100%.

The ice cream with a low fat content had a very creamy texture. The freshly prepared product as well as that which had undergone accelerated ageing was compared with other referenced products which had been subjected to similar constraints. The tasters found that the products freshly prepared according to the invention gave a slight sensation of cold, had a fattier texture, and had less crystals.

The mean diameter of the ice crystals ($D_{1.0}$, micron) measured by optical microscopy at −10° C., as described in example 1, were:

|  | Example 12 | Reference |
|---|---|---|
| $D_{1,0}$ before ageing | 18 | 24 |
| $D_{1,0}$ after ageing | 67 | 81 |

EXAMPLES 13–16

Mixtures for sorbet were prepared. To a mixture at 60° C. of 0.8% stabilizers (gelatine, carob gum) was added 29% sugar, 10% glucose syrup, 35% unsweetened puree of raspberries, a coloring, and a raspberry flavoring as well as a food grade acid to provide a pH of 3.2–3.4. The solid content of the composition was 30.30%, the rest being water. The mixture was homogenized at 72° C. in one stage at a pressure of 50 bar, was then pasteurized at 85° C. for 30 min., cooled at 4° C., and left standing for at least 4 h at that temperature.

The mixture for freezing was introduced into the device with the same screw configuration as in Example 10. The operating conditions were the same as those for Example 10, apart from the following:

—Injection of air: in 9 of the two sides in F5 and F6, being by 4 conduits with an outflow of 2.5, 12, and 15 g/h.

—Screw rotation speed: of 100 and 300 r/min.

The following parameters were taken for the emerging products:

| Example | 13 | 14 | 15 | 16 |
|---|---|---|---|---|
| Air Flow(g/h) | 2 | 5 | 12 | 15 |
| Speed (r/min) | 100 | 100 | 100 | 300 |
| Exiting temperature(° C.) | −16 | −16 | −16.5 | −10.5 |
| Overrun (%) | 24 | 40 | 92 | 150 |

The textures of the resulting products reminded one of ice creams, despite the total absence of fat.

The taste comparison with a sorbet of the same composition prepared in the conventional manner, gave it a less cold character, the merest hint of crystals, the greatest sensation of fats, and the least roughness, both for the freshly prepared products as well as for those which had undergone ageing.

EXAMPLES 17–19

Example 17: The procedure used in Example 10 was followed with homogenization, but the maturation stage was eliminated.

Example 18: The procedure used in Example 10 was followed, but the homogenization stage was eliminated.

Example 19: The procedure used in Example 10 was followed, but the homogenization and maturation stages were both eliminated.

Tasting the newly prepared products as well as structural measures (size of crystals, destabilization of the fats) on products freshly prepared and after ageing showed only minor differences in relation to the same products which had been put through homogenization and maturation.

In the preceding Examples, the method and the device were described in relation to the manufacture of iced mixtures without specifying that one could also process by coextruding various ice creams or different colored and flavored sorbets to obtain composite products such as, for example, a marbled product.

Of course, the method would also be applicable to the manufacture of frozen products such as mousses; creams; sweet or savory spreads, for example of cheese, vegetables, meat or fish; or with sauces or salad dressings. In these cases, the flexibility of the method allows the incorporation of air in the mass to be frozen to be adapted to be more or less in keeping with the degree of overrun that is required to obtain the characteristics that are desired for the specific type of product being manufactured.

EXAMPLE 20

Comparison of the Process of the Invention with Conventional Processes

Vanilla ice cream was prepared by three different processes and the structural characteristics of the ice cream prepared by each process was evaluated.

A mass to be frozen (a conventional vanilla ice cream mix) was prepared and the resulting composition was used to manufacture vanilla ice cream according to each of three processes.

Process 1: Is the process of the invention using the twin screw freezer of the invention. The temperature at the output nozzle was −12° C. and the overrun was 80%.

Process 2: Is the standard process used to manufacture frozen aerated products. The process uses a barrel shaped scraped surface heat exchanger. Freezing is carried out in the barrel shaped exchanger. The barrel contains a rotor carrying scraper blades. During operation the blades swing out and scrape the inner wall of the barrel. The barrel is jacketed and a refrigerant circulates in the jacket. Ice cream mix and air are pumped through the barrel. The ice cream mix is chilled against the wall of the barrel and starts to freeze. The frozen ice cream is scraped off the wall of the barrel with the scraper blades and intensively mixed with air. The ice cream is only cooled to −6° C. and, after exiting the barrel, is further frozen in a hardening chamber. The temperature at the output nozzle was −6° C. and the overrun was 80%.

Process 3: Is a process using a twin screw extruder for post cooling. Process 3 is similar to the process disclosed in EP 401512 and EP 561118. The process avoids post-hardening by using a "dynamic post-hardener." The equipment consists of a co-rotating twin screw extruder wherein the screws are inter-meshing, but not self cleaning, operating at a low speed (i.e., 20–40 rpm). The twin screw extruder is contained in a barrel and the barrel is cooled with a cooling agent. According to this process ice cream is produced in a standard freezer and then fed into the twin screw extruder and cooled to −12° C. for ice cream (−16° for sorbet). The temperature at the output nozzle was −12° C. to −13° C. and the overrun was 100%.

Samples of ice cream prepared by each process were analysis using a dispersion technique wherein the ice cream was dispersed in mineral oil at −10° C. and examined under a microscope. The method was taken from procedure disclosed in "Determination of Ice Crystal Size Distributions in Frozen Desserts," by D. P. Donhowe et al., *J Dairy Sci.,* 74: 3334–3344 (1991). Ice cream was stored at −25° C. and tempered by slowly warming it to −10° C. in a cold cabinet. All measurements were made in the cold cabinet and a powerful fan was used to assure an air temperature of −10° C. and the sample preparation table was at −10±0.2° C. Small samples of the ice cream were taken out of representative areas of the container using pre-cooled tools and gloves. The ice cream sample was mixed with mineral oil and spread over a microscope slide. The oil and slide were pre-cooled to −10° C. The samples were then observed using an optical microscope at −10° C. The microscope was equipped with heat filters at the light source. Magnification was between 100 and 150×. Images of multiple points were captured with a video camera and submitted to computer assisted quantitative analysis (PC-image, commercially available from Synoptics Ltd., of Cambridge, United Kingdom) to be automatically analyzed. The microscope and analysis system was calibrated using latex balls of various known sizes similar in size to the crystals being evaluated. Calibration was repeated before and after measurements.

The Automated quantitative image analysis confirms that ice cream manufactured by the process of the invention has the smallest ice crystals. The dispersion technique allows the structure of ice crystals and air cells to be examined. FIG. 3 shows air cells in ice cream produced by each process. Panels A, B, and C of FIG. depict air cells in ice cream manufactured by processes 1, 2, and 3, respectively. Air bubbles are indicated by arrows and yellow arrow show air tubes. These panels show that the ice cream manufactured by the process of the invention (panel 1) has the smallest air cells and that the biggest air cells are observed in ice cream manufactured by process 2.

FIG. 4 shows ice crystals in ice cream produced by each process. Panels 1, 2, and 3 depict ice crystals in ice cream manufactured by processes A, B, and C, respectively. FIG. 4 shows that the ice cream manufactured by the process of the invention (panel 1) has the smallest ice crystals and that the mean equivalent diameter of these crystals is less than the mean equivalent diameter of ice crystals in ice cream prepared by the the other processes. FIG. 4 also shows that ice cream manufactured by the process of the present invention contains much fewer large aggregates of ice crystals compared to ice cream manufactured by either process 2 or process 3.

A comparison of the results of the automated quantitative image analysis for the ice crystals in ice cream manufactured by processes 1 and 2 is provided below.

TABLE 1

Equivalent Diameters

|  | Process 1 | Process 2 |
|---|---|---|
| mean ($\mu$m) | 32 | 40 |
| Sd* | 8 | 13 |

*Sd = standard deviation.

TABLE 2

Elongation

|  | Process 1 | Process 2 |
|---|---|---|
| Mean | 3.83105 | 5.23437 |
| Sd* | 5.49298 | 20.7658 |
| N | 615 | 551 |

*Sd = standard deviation.

The term "elongation," as used herein is the ratio of the largest dimension to the smallest dimension for each ice crystal.

The data provided in these tables shows that the ice crystals in ice cream prepared by process 1 are smaller and rounder, i.e., less elongated, than the ice crystals in ice cream prepared by process 2.

The results for the mean diameter as measured by automated quantitative image analysis for ice cream manufactured by process 1, 2, and 3 is depicted graphically in FIG. 5, as panels A, B, and C, respectively. The ice cream prepared by the process of the invention has the smallest ice crystal size. Similarly, the ice cream prepared by the process of the invention has a more narrow size distribution compared to ice cream prepared by the conventional processes.

The structural characteristics of the ice cream prepared by each process was also evaluated using the technique of cryofixation. Cryofixation is a semi-destructive technique that preserves the 3-dimensional structure of the specimen by chemically processing the specimen before embedding it in a resin and is adaptation of the cryosubstitution technique. The samples were cryofixed and cryoprotected at −15° and then processed at 4° C. The samples are infiltrated in an acrylic resin and after polymerisation the samples are thin sectioned (5 $\mu$m thin sections) at room temperature using a microtome and a tungsten knife and placed on glass slides. Various imaging techniques allow different structures to be highlighted and various histological staining methods and labeling techniques (i.e., immuno-labeling, for example) allow specific ingredients to be identified. Microscopic evaluations was performed with a Polyvar microscope (commercially available from Schott Fiber Optics Inc., of Southbridge, Mass.).

To view air and ice structures in the ice cream the sections obtained from cryofixation were stained with Toluidin blue and viewed successively with fluorescence and bright field illumination. To view fats in the ice cream the sections were stained with Nile red and viewed with fluorescence microscopy. To view proteins the sections were stained with Anilino-Sulfonic acid and viewed by fluorescence or labeled using anti-bodies and viewed by indirect immunofluorescence.

Figures 7, 7A, 7B, 7C, 7D:
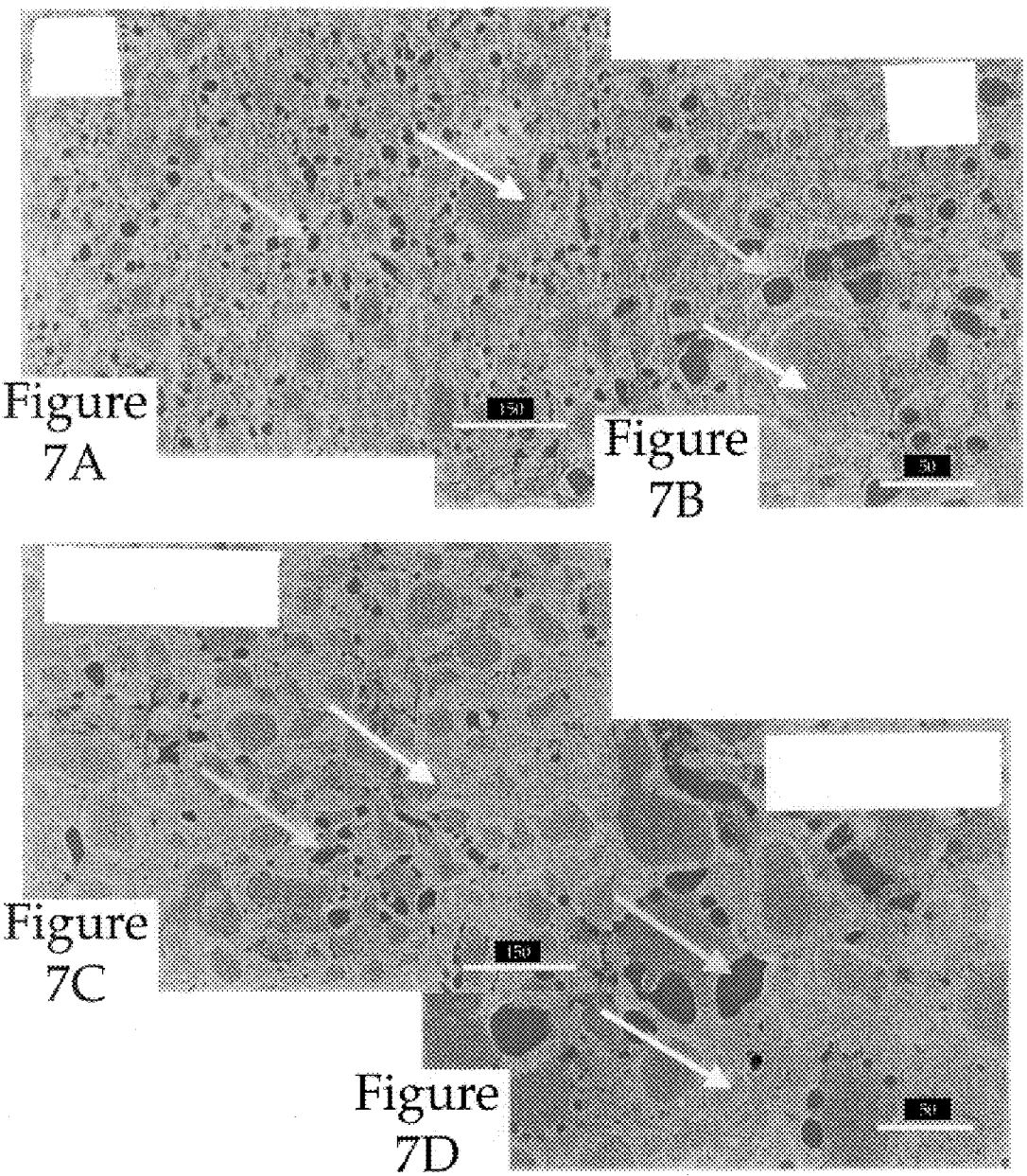
FIG. 7A–7D is a computer assisted photomontage of ice creams made by three different processes prepared by a cryofixation technique, which is an adaptation of the crysubstitution technique.

FIGS. 6–7 shows the ice crystals in a thin section prepared by cryofixation for ice cream prepared according to each process. In these figures the ice crystals appear in red and the air bubbles in a light color. The continuous phase is brown or green. Brightness and color differences are due to technical variations such as delay after staining and illumination. Panel A of FIG. 6, shows the ice crystals in ice cream prepared the process of the invention. Panel B of FIG. 6 shows the ice crystals in ice cream prepared according to process 2 and FIGS. 3 and 4 shows the ice crystals in ice cream prepared according to process 3. Panels A and B of FIG. 7 also shows the ice crystals in ice cream prepared the process of the invention while panels C and D of FIG. 7 show the ice crystals in ice cream prepared by process 2.

Figure 8:
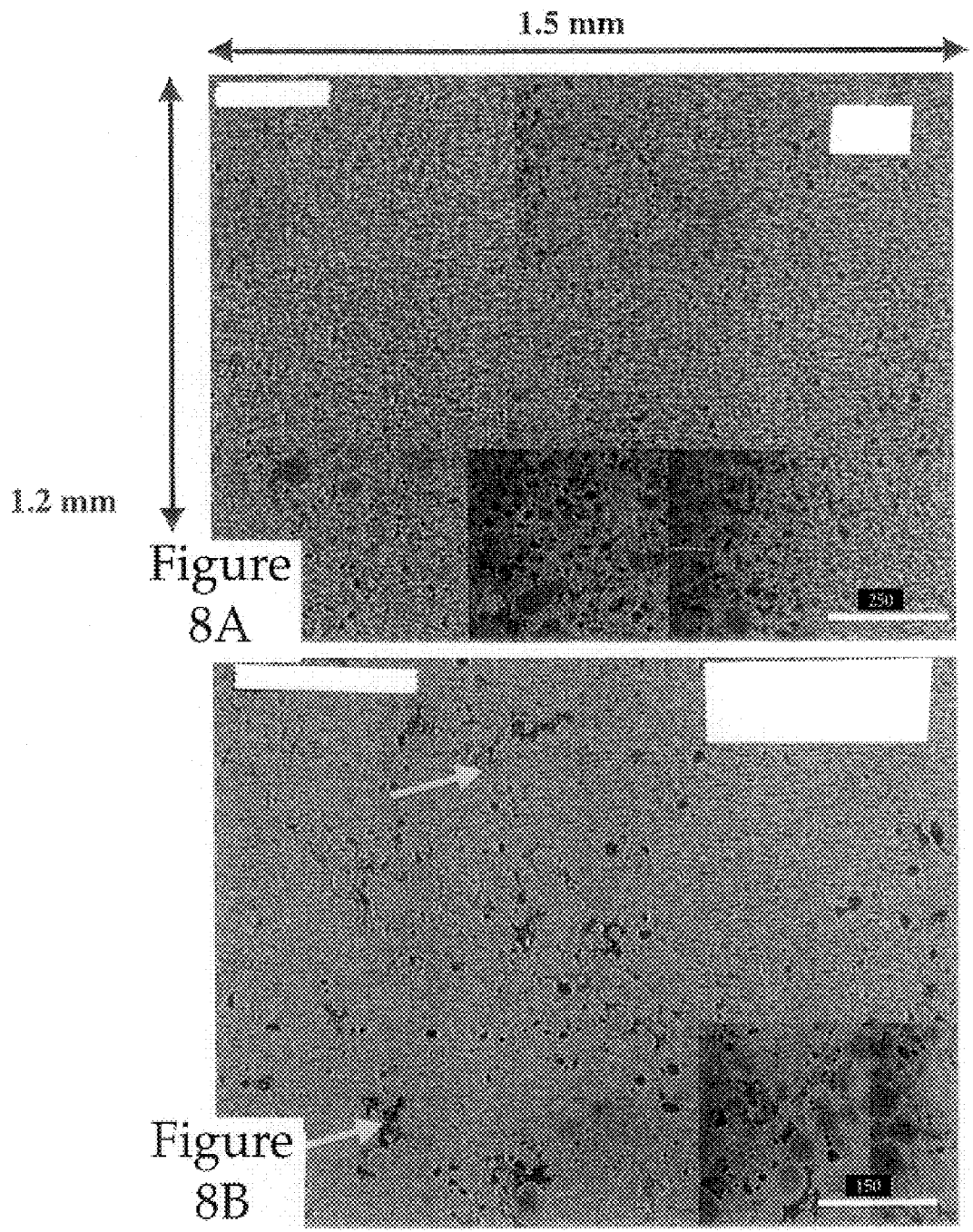
FIG. 8A–8D is a computer assisted photomontage of ice creams made by three different processes prepared by a cryofixation technique, which is an adaptation of the crysubstitution technique.

FIG. 8 is a photomontage to compare rather wide areas of the section and to show the structural homogeneity of the ice cream of the invention. Panel A of FIG. 8 show the ice crystals in ice cream prepared the process of the invention and panel B of FIG. 8 show the ice crystals in ice cream prepared by process 2. The ice crystals are black (red arrows). The yellow arrow shows protein aggregation (stained with toluidin blue) in the ice cream made by process 2.

Analysis of the thin films obtained by cryofixation show that ice crystals are smallest in the ice cream prepared by the process of the invention. FIG. 8 also shows that the ice crystal size and the ice crystal dispersion is more homogenous in the ice cream produced by the process of the invention. FIG. 8 also shows that protein aggregates (yellow arrows) are present in ice cream prepared by process 2 but are absent in ice cream prepared by the process of the invention.

FIG. 9 shows a comparison of ice cream prepared by the process of the invention (panel A) with an ice cream prepared by process 2 (panel B) after heat shock. Each sample of ice cream was subjected to heat shock by exposing the product to elevated temperature and then recooling the product several times. FIG. 9 shows that, even after heat shock, air cells (red arrows) and ice crystals (white arrows) are smaller in the ice cream made by the process of the invention.

Fat distribution in ice cream prepared by each process was also examined by cryofixation. Fats were stained using Nile red, a liposoluble stain. FIG. 10 shows fat distribution in a typical ice cream. FIG. 10, panel B, is an enlargement of the area depicted by the red arrow in panel A. This Figure shows that in a typical ice cream fats accumulate at the periphery of air cells, i.e., at the air-continuous phase interface, and that few fat globules are found in the continuous phase.

FIG. 11 also shows fat distribution in ice cream. The sections depicted in FIG. 11 were stained for 5 minutes with an aqueous solution of Nile red. FIG. 11 depicts the distribution of fats in ice cream made by process 3 (panel A), which is similar to the distribution of fats in ice cream made by process 2 (FIG. 10). FIG. 11, panel A, again shows that the fats accumulate at the periphery of air cells, i.e., at the air-continuous phase interface, and that few fat globules are found in the continuous phase in ice cream prepared by conventional processes. FIG. 11, panel B, shows fats in ice cream prepared by process 2 under lower magnification. From FIG. 11, panel B it can be seen that the fat globules surround small ice crystals. FIG. 11, panels C and D depict the distribution of fats in ice cream made by the process of the invention at different magnifications. A comparison of panels A and B of FIG. 11 with panels C and D show that in ice cream prepared according to the process of the invention is distributed more homogeneously in the continuous phase compared to the ice cream prepared by either process 2 or 3. The reddish color in panels C and D show that the fat is substantially homogeneously distributed in the ice cream of the invention. Furthermore, FIG. 11 shows that the fat is distributed quite differently from that fat distribution in ice cream made by either process 2 or 3 in that the fat does not accumulate at the air-continuous phase interface. Without wishing to be bound by theory it is believed that the fat distribution in the ice cream prepared by the process of the present invention leads to a creamier ice cream, a less cold texture, and a slower melting rate.

Protein distribution in ice cream prepared by each process was also examined by cryofixation. Protein distribution was studied using polyclonal rabbit anti-casein and anti-beta lactoglobulin antibodies using indirect immunofluorescence microscopy. Sections obtained from crofixation were incubated overnight in the presence of specific polyclonal antibodies (rabbit anti beta-lactoglobulin and anti whole casein, for example) diluted 1/400 in a Tris buffer (0.05m, Ph 8.6). The sections were then rinsed and washed in the buffer and incubated for 1 hour in anti rabbit IgG labeled with fluorescein iso-thiocyanate (diluted 1/100 in the buffer), rinsed in the buffer, washed with distilled water, and mounted in mowiol. Observations were carried out using epifluorescence microscopy (excitation light: 455–490 nm, emission: 515 nm). In ice cream prepared by process 2 the proteins tend not to distribute homogeneously and tend to form aggregates as shown in FIG. 11, panel B. FIG. 12 depicts casein distribution in ice cream prepared by process 1, 2, and, 3 (panels A, B, and C respectively). Examination of these panels shows that in ice cream made by either process 2 or 3 the casein tends to aggregate and is distributed in a patchwork pattern. In contrast, in ice cream prepared by the process of the invention the patchwork pattern completely disappears. The casein is distributed most homogeneously in ice cream manufactured by the process of the invention.

FIG. 13 shows a simultaneous visualization of fat distribution and protein distribution. In FIG. 13 fats and proteins were stained simultaneously. The sections were labeled by anti-casein antibodies using indirect immunofluorescence prior to fat staining with Nile red. In FIG. 13 when casein and fats are stained simultaneously (panel A) only a red color shows because labeling of fats extinguishes the green staining due to the labeling of casein. This suggests that in ice cream prepared according to the process of the invention fat distribution and casein distribution overlap substantially completely. In contrast, when beta lactoglobulin and fats are stained simultaneously (panel B) some green areas corresponding to the labeled beta lactoglobulin are still visible. This suggests that the distribution of fats and beta lactoglobulin do not overlap completely.

The above comparison demonstrates that ice cream prepared by the process of the invention, process 1, has a different morphology compared to ice cream manufactured by process 2 or process 3. In particular, the ice cream prepared by process I is characterized by smaller ice crystals. In addition, the technique of cryofixation shows that the distribution of fats and proteins in ice cream prepared by the process of the invention is more homogeneous compared to ice cream prepared by process 2 or 3.

EXAMPLE 21

Comparison of the Process of the Invention with Conventional Processes

Vanilla ice cream was prepared by three different processes and the structural characteristics of the ice cream prepared by each process was evaluated.

A conventional vanilla ice cream mix, 8 percent fat, was prepared and the resulting composition was used to manufacture vanilla ice cream according to each of three processes.

Process A: Is the process of the invention using the twin screw freezer of the invention. The temperature at the output nozzle was −9° C., the overrun was 100%, and the throughput was 10 kg/hour. Samples went through a hardening tunnel at −40° C. and were then stored at −40° C.

Process B: Is a process using a twin screw extruder for post cooling. Process B is similar to the process disclosed in EP 401512 and EP 561118. The ice cream was first prepared in a conventional freezer at a throughput of 100 kg/hour with an overrun of 110% and an exit temperature of −5 ° C. The ice cream was then conveyed in a Schroeder Kombinator type 65/1000F (commercially available from Schroeder GMBH & Co. of Luebeck, Germany) that was operated according to the specifications of the manufacturer. The exit temperature was −12.1 ° C. and the overrun was 100%. Increased air addition of 5–10% by volume at the standard procedure was required to compensate for loss of overrun through the Schroeder Kombinator.

Samples of ice cream prepared by each process were evaluated using a sensory panel of 11 trained panelists. Products were tempered at −17° C. for 24 hours before tasting. Evaluation of the products was conducted blindly in individual booths under red light following a balanced experimental design with all panelists tasting each product, 2 replications per panelist. A scale of 0 to 10 was used to rate the attributes of coldness, smoothness, and melting. The results are provided in Table 3.

TABLE 3

Sensory Panel Evaluation of Ice Cream Prepared by each Process

| Attribute | Process A | Process B | Comments |
|---|---|---|---|
| Coldness | 4.95 | 6.24 | The ice cream prepared by process A was significantly ($p < 0.05$) perceived as less cold than the ice cream prepared by process B. |
| Smoothness | 7.59 | 6.12 | The ice cream prepared by process A was significantly ($p < 0.05$) perceived as smoother than the ice cream prepared by process B. |
| Melting | 2.75 | 5.06 | The ice cream prepared by process A melts significantly ($p < 0.05$) slower than the ice cream prepared by process B. |

The results of the sensory evaluation show that the ice cream prepared by the process of the invention, process A, was perceived to be significantly different from the ice cream prepared by process B. In particular, the ice cream prepared by the process of the invention was firmer, less sticky, less cold, smoother, chewier, and slower melting.

What is claimed is:

1. A frozen aerated product without fat having a mean ice crystal diameter of between about 20 to 60 microns, a mean equivalent diameter for the ice crystals of between about 32 and 36 microns, and an overrun of 92 to 150%.

2. The frozen aerated product of claim 1, wherein protein is substantially homogeneously distributed through out the frozen aerated product.

3. The frozen aerated product of claim 2, wherein the protein is casein.

4. A frozen aerated product containing fat having a mean ice crystal diameter of between about 20 to 60 microns, a mean equivalent diameter for the ice crystals of between about 32 and 36 microns, and fat globules with a mean diameter of from about 8 to 20 microns.

5. The frozen aerated product of claim 4, having an overrun between about 20 and 150 percent.

6. The frozen aerated product of claims 4, wherein the fat is substantially homogeneously distributed through out the frozen aerated product.

7. The frozen aerated product of claim 4, wherein protein is substantially homogeneously distributed through out the frozen aerated product.

8. The frozen aerated product of claim 7, wherein the protein is casein.

9. A method for manufacturing a frozen aerated product which comprises mixing, aerating, freezing, and cooling a liquid based composition to a temperature of less than or equal to −8° C. in a single stage followed by extruding the composition to provide a frozen aerated product having a mean ice crystal diameter of between about 20 to 60 microns and a mean equivalent diameter for the ice crystals of between about 32 and 36.

10. The method of claim 9, wherein the liquid based composition is introduced into the stage at about 2 to 5 ° C.

11. The method of claim 10, wherein the liquid based composition is mixed, aerated, frozen, and cooled in a casing that contains two parallel endless co-rotating screws, turning in the same direction while meshing with each other.

12. The method of claim 11, wherein the co-rotating screws turn at about 100–600 r/min and the liquid based composition is aerated to about 20–150% overrun and cooled to about −8 to −20° C. before being extruded.

13. The method of claim 9 further comprising incorporating fat globules having a mean diameter of from about 8 to 20 microns in the composition prior to extrusion.

14. A frozen aerated product produced by the process of claim 13.

15. A frozen aerated product produced by the process of claim 9 and having an overrun of 92% to 150%.

* * * * *

UNITED STATES PATENT AND TRADEMARK OFFICE
CERTIFICATE OF CORRECTION

PATENT NO.    : 6,613,374 B1
DATED         : September 2, 2003
INVENTOR(S)   : Fayard et al.

It is certified that error appears in the above-identified patent and that said Letters Patent is hereby corrected as shown below:

Column 1,
Line 5, delete "January 28, 1999" and insert -- January 29, 1999 --.

Signed and Sealed this

Twenty-third Day of December, 2003

JAMES E. ROGAN
*Director of the United States Patent and Trademark Office*